United States Patent
Chen

[11] Patent Number: 5,226,685
[45] Date of Patent: Jul. 13, 1993

[54] COLLISION-AVOIDANCE SAFETY APPARATUS FOR A CAR

[76] Inventor: Yung-Hsing Chen, 2nd Fl. 64 Tzu-Li Street, Hsin Tien Town, Taipei, Taiwan

[21] Appl. No.: 813,527

[22] Filed: Dec. 26, 1991

[51] Int. Cl.$^5$ .............................................. B60R 19/04
[52] U.S. Cl. .................................. 293/102; 180/276; 188/5; 293/6
[58] Field of Search .................. 293/1, 2, 6, 102, 120, 293/111.1, 136; 180/276; 188/5

[56] References Cited

U.S. PATENT DOCUMENTS

| | | | |
|---|---|---|---|
| 1,427,916 | 9/1922 | Sheinker | 180/276 |
| 1,493,929 | 5/1924 | Garcia | 293/2 |
| 1,642,879 | 9/1927 | Icre | 180/276 |
| 3,361,467 | 1/1968 | Ludwikowski | 293/136 |
| 3,472,332 | 10/1969 | Halvajian | 293/6 X |
| 3,917,020 | 11/1975 | Saab | 180/276 |
| 4,082,338 | 4/1978 | Hutai et al. | 293/136 |
| 4,474,395 | 10/1984 | Harloff et al. | 293/136 X |

Primary Examiner—Charles A. Marmor
Assistant Examiner—Andrew C. Pike
Attorney, Agent, or Firm—Bacon & Thomas

[57] ABSTRACT

A collision-avoidance safety apparatus for a car has a reaction force absorber for absorbing at least some of a reaction force of an impact of an object upon the car pivotally mounted on a supporting component fixed to a frame of the car. The reaction force absorber is a swinging component having an up end with a steel or hard rubber plate and a spring mounted thereon. It is attached to the supporting component by a middle portion inserted into a hole in the supporting component. A down end with a wheel mounted thereon contacts the ground when a force acts on the up end.

2 Claims, 4 Drawing Sheets

COLLISION-AVOIDANCE SAFETY APPARATUS FOR A CAR

BACKGROUND OF THE INVENTION

The increasing number of accidents of car traffic, particularly on highways, has caused various specialists to design special fixtures installed at the front or back of a car to reduce accident casualties. According to Newton's Third Law, an action force acting on a structure imparts a reaction force equal in magnitude, but opposite in direction. The conventional safety fixtures are scarcely successful in reducing damage, as the reaction force is still reflected directly to this fixture and to the car.

SUMMARY OF THE INVENTION

The present invention discloses an apparatus which clearly differs from the traditional type and which transfers most of the reaction force to the ground.

This safety apparatus comprises two parts, a supporting component and a swinging (moving) component (hereafter referred to as the swinging component). One end of the supporting component is fixed to the frame or chassis of a car while the other end holds the swinging component.

When one end of swinging component in the front or rear of a car is struck by an object, the other end will drop to the ground, which thereby absorbs the reaction force.

DETAILED DESCRIPTION OF THE PREFERRED EMBODIMENT

Figure 1:
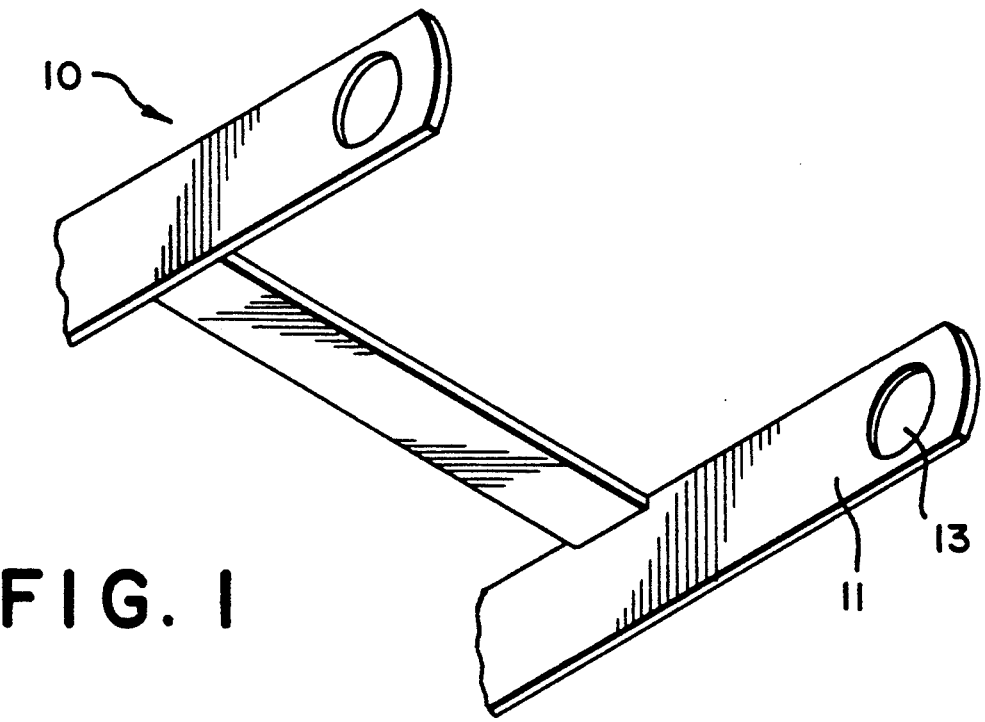
FIG. 1 is a perspective view of a supporting component.
Figure 2:
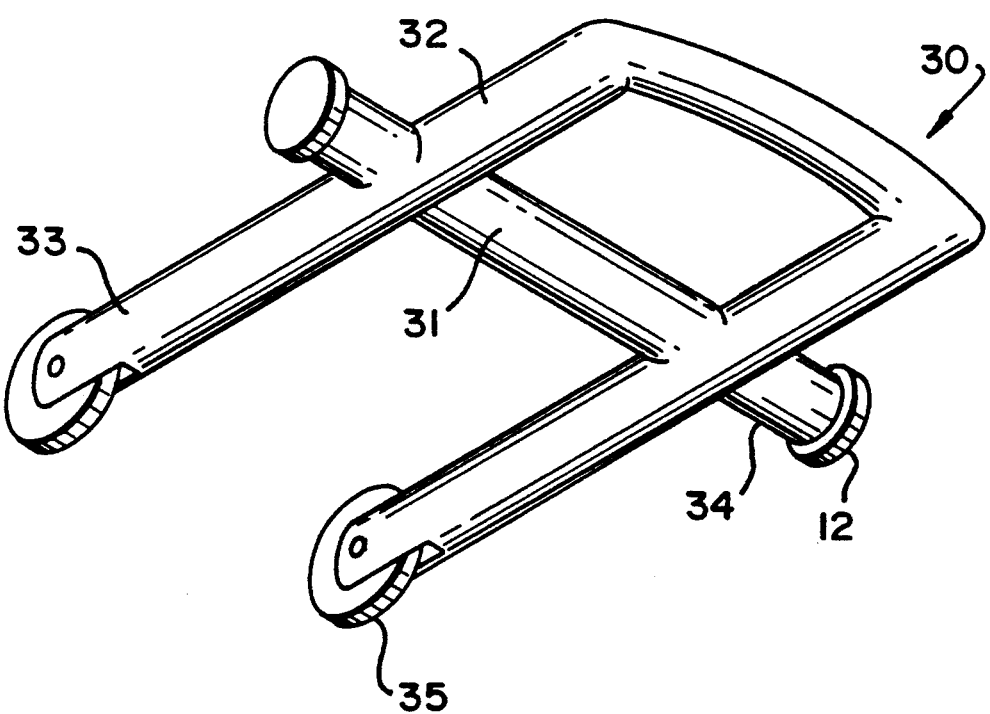
FIG. 2 is a perspective view of a swinging component.
Figure 3:
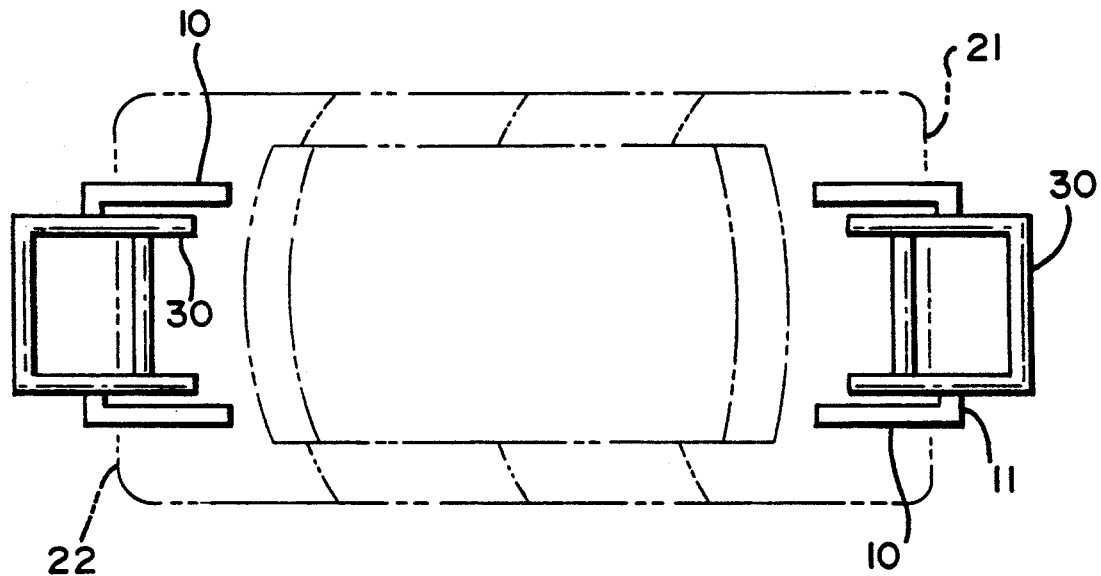
FIG. 3 shows a plan view of the apparatus according to the present invention.
Figure 4:
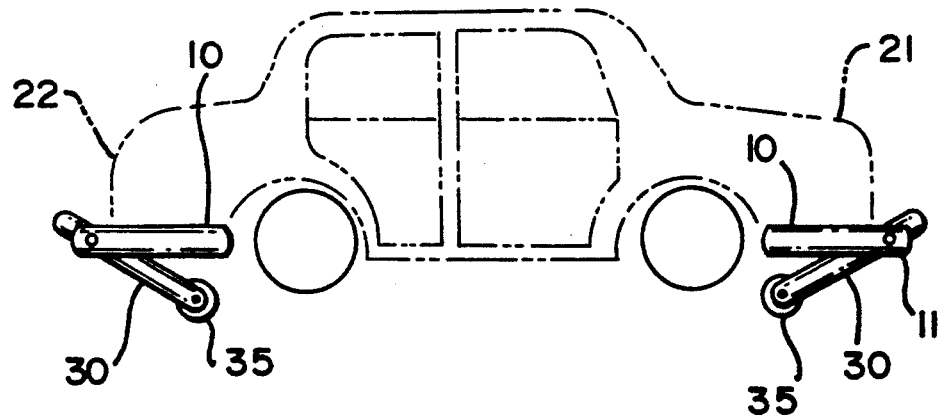
FIG. 4 shows a side view of the apparatus corresponding to the plan view of FIG. 3.

With reference to the drawings, this invention comprises two parts, a supporting component 10 (see FIG. 1) and a swinging component 30 (see FIG. 2). One end of supporting component 10 is fixed to the frame or chassis of a car. The other end of the supporting component 10 extends outside the front 21 or rear 22 (or both) of a car's body, as seen in FIGS. 3 and 4.

The supporting component 10, which is made of metal, such as block or rod, has a supporting part 11, which is used to support swinging component 30.

The swinging component 30 includes an up end 32, a middle part 31, and a sown end 33. Both sides 34 of the middle part 31 are inserted into the hole 13 of supporting component 10. A bearing 12 is installed between the sides 34 and hole 13.

Under normal conditions, up end 32 of swinging component 30 extends outside the front body 21 and/or the rear body 22. Down end 33 of swinging component 30 maintains a distance D from ground 40. When up end 32 of swinging component 30 is struck, down end 33 will drop to the ground 40. To keep the down end sliding, a wheel 35 is installed at down end 33 of swinging component 30. For maintenance of stabilization, a spring 50 is fixed between supporting component 10 and swinging component 30.

Figures 5, 6A, 6B:
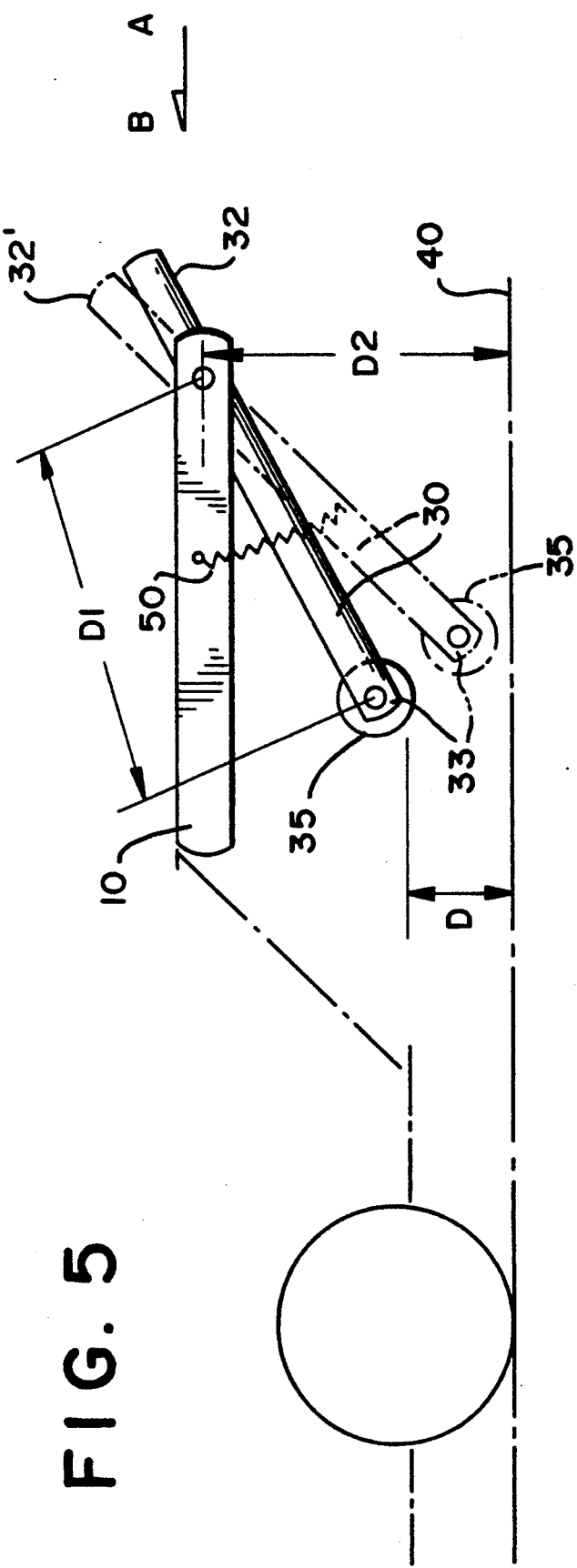
FIG. 5 is a partial, enlarged side view illustrating the swinging action.
FIG. 6(a) and 6(b) are vector analysis diagrams.

FIG. 5, and FIGS. 6(a) and 6(b) illustrate how the reaction force is transferred to the ground and how the reaction force is dissipated.

When force AB strikes up end 32 of swinging component 30, up end 32 moves to a position 32'. $\vec{AB}$ vector, see FIG. 6(a), swings to $\vec{ab}$ direction, and wheel 35 of swinging component 30 will concurrently touch the ground 40. In this situation, the vector diagram FIG. 6(b) forms two separate forces ac and cb.

$$\vec{ab} = \vec{ac} + \vec{cb}$$

ab stands for the striking (action) force derived from another object. With this safety apparatus, $\vec{ab}$ force divides into $\vec{ac}$ and $\vec{cb}$ forces. As $\vec{cb}$ force is absorbed by the ground, only $\vec{ac}$ force exists. In order to further reduce the $\vec{ac}$ force, this apparatus is designed such that the distance D1 between middle part 31 and down end 33 of swinging component 30 is longer than the distance D2 between middle part 31 of swinging component 30 and ground 40. When the striking (action) force ab is sufficiently strong that that car is forced to leave ground 40 and when the down end 33 of swinging component 30 touches the ground 40, the car moves in stricken (reaction) force direction without damaging the car. The results:

a. Engine power ineffective to move ahead.

b. The car moves in stricken (reaction) force direction.

The $\vec{ac}$ separate force is reduced without damaging the car accordingly.

Figure 7:
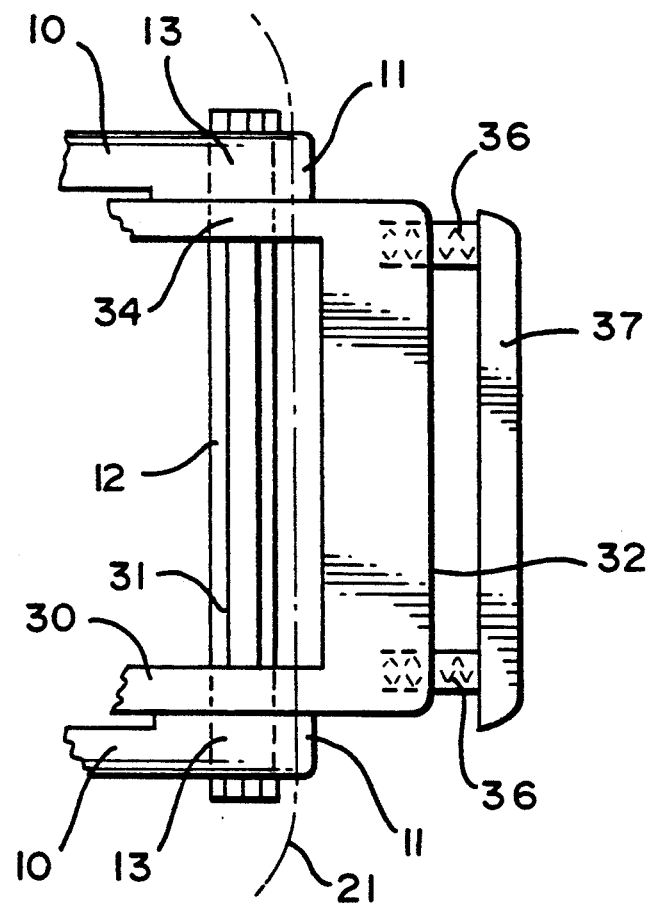
FIG. 7 is a partial, plan view illustrating the two components and an additional safety apparatus.

FIG. 7 illustrates an alternative embodiment in which a compressive part (spring) 35 and a steel plate (or hard rubber) 37 are positioned in front of the up end 32 of swinging component 30, such that the safety apparatus in strengthened.

I claim:

1. A collision-avoidance safety apparatus for a car comprising reaction force absorbing means for absorbing at least some of a reaction force of an impact of an object upon the car, and a supporting component having one end fixed to a frame of the car and another end supporting said reaction force absorbing means, wherein said reaction force absorbing means comprises a swinging component having an up end with a steel or hard rubber plate and at least one spring mounted thereon, a middle portion inserted into a hole of said supporting component, and a down end with at least one wheel mounted thereon.

2. The collision-avoidance safety apparatus of claim 1 wherein a distance (D1) between the middle portion and the down end is greater than a distance (D2) between the middle portion and a ground surface.

* * * * *